(12) United States Patent
Cone et al.

(10) Patent No.: US 8,397,493 B1
(45) Date of Patent: *Mar. 19, 2013

(54) METHOD FOR RECOVERING WASTE HEAT FROM EXHAUST

(75) Inventors: Robert E. Cone, Houston, TX (US); Mitzi Jones Gass, Missouri City, TX (US); Matthew Wayne Wishert, Magnolia, TX (US)

(73) Assignee: Maxim Silencers, Inc., Stafford, TX (US)

( * ) Notice: Subject to any disclaimer, the term of this patent is extended or adjusted under 35 U.S.C. 154(b) by 218 days.

This patent is subject to a terminal disclaimer.

(21) Appl. No.: 13/033,032

(22) Filed: Feb. 23, 2011

Related U.S. Application Data

(60) Provisional application No. 61/307,927, filed on Feb. 25, 2010.

(51) Int. Cl.
| | |
|---|---|
| F01K 23/10 | (2006.01) |
| F01N 3/10 | (2006.01) |
| F01N 3/02 | (2006.01) |
| F01N 5/02 | (2006.01) |
| F01N 1/14 | (2006.01) |
| F03G 7/00 | (2006.01) |
| F02K 1/00 | (2006.01) |

(52) U.S. Cl. ............. 60/320; 60/274; 60/299; 181/251; 181/257; 181/268; 181/275; 181/283

(58) Field of Classification Search ............... 181/251, 181/257, 268, 275, 283; 60/274, 299, 320
See application file for complete search history.

(56) References Cited

U.S. PATENT DOCUMENTS

| 1,775,939 | A | * | 9/1930 | Matthaei | 165/155 |
|---|---|---|---|---|---|
| 4,450,932 | A | * | 5/1984 | Khosropour et al. | 181/211 |
| 5,016,438 | A | * | 5/1991 | Harris | 60/299 |
| 5,403,557 | A | * | 4/1995 | Harris | 422/169 |
| 5,578,277 | A | * | 11/1996 | White et al. | 422/180 |
| 5,921,079 | A | * | 7/1999 | Harris | 60/288 |

* cited by examiner

*Primary Examiner* — Kenneth Bomberg
*Assistant Examiner* — Brandon Lee
(74) *Attorney, Agent, or Firm* — Buskop Law Group, PC; Wendy Buskop

(57) ABSTRACT

One or more methods for recovering waste heat from a combustion system performing a first operation and a second operation with the waste heat are provided herein. The method can include providing exhaust from a combustion system performing the first operation to an inner housing of a heat recovery silencer. Heat can be transferred from the exhaust to a heat transfer fluid in a heat recovery flow path to form a heated heat transfer fluid. The heat recovery flow path can be formed between the inner housing and an outer housing of the heat recovery silencer to form a heated heat transfer fluid.

19 Claims, 6 Drawing Sheets

METHOD FOR RECOVERING WASTE HEAT FROM EXHAUST

CROSS REFERENCE TO RELATED APPLICATIONS

The present application claims priority to and the benefit of U.S. Provisional Application Ser. No. 61/307,927 filed on Feb. 25, 2010, entitled: "METHOD FOR RECOVERING HEAT FROM EXHAUST". This reference is incorporated in its entirety herein.

FIELD

The present embodiments generally relate to a method for recovering waste heat from a combustion system performing a first operation an performing a second operation with the waste heat.

BACKGROUND

A need exists for a method for recovering waste heat from a first combustion system in an efficient manner and using the waste heat to perform an auxiliary operation.

A further need exists for a method of performing an auxiliary operation that can eliminate the need for a second combustion system to prevent unnecessary emissions.

Furthermore, there is a need for a method of performing an auxiliary operation that eliminates the need for multiple combustion systems to prevent unnecessarily unsafe working conditions.

A need also exists for a method of muffling or eliminating a sound emanating from an exhaust system of a combustion system and efficiently recovering waste heat from exhaust gas from the combustion system.

The present embodiments meet these needs.

BRIEF DESCRIPTION OF THE DRAWINGS

The detailed description will be better understood in conjunction with the accompanying drawings as follows.

Figure 1:
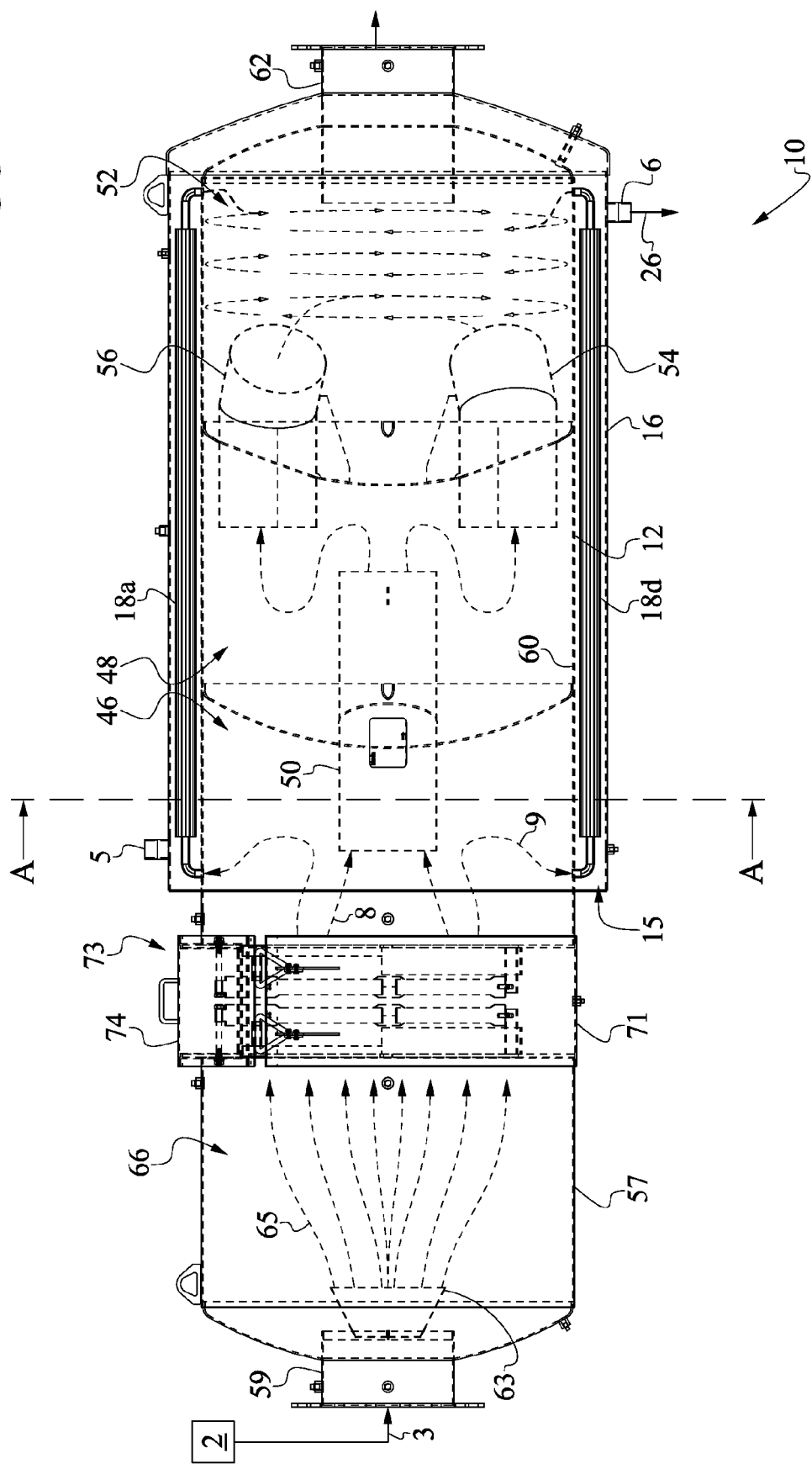
FIG. 1 depicts a side view of an illustrative heat recovery silencer according to one or more embodiments.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method for recovering waste heat from a combustion system performing a first operation an performing a second or additional operation with the waste heat.

The additional operation can include dehydrating gas, heating water, accelerating a chemical reaction, generating electricity, running a regeneration unit, or combinations thereof.

One or more embodiments of the method for recovering waste heat from a combustion system used to perform a first operation and performing a second operation with the waste heat can include providing exhaust from a combustion system to an inner housing of a heat recovery silencer.

Heat can be transferred from the exhaust to a heat transfer fluid in a heat recovery flow path to form a heated heat transfer fluid. The heat recovery flow path can be formed between the inner housing and an outer housing of the heat recovery silencer to form a heated heat transfer fluid.

The heated heat transfer fluid can flow from the heat recovery flow path to an auxiliary device inlet port of an auxiliary device. The auxiliary device can use the heated heat transfer fluid to perform an additional operation and form a used heated heat transfer fluid.

The used heated heat transfer fluid can be recycled back to an inlet of the heat recovery flow path.

One or more embodiments of the method can include removing water from a wet gas by using the heated heat transfer fluid to form a saturated heat transfer fluid.

The saturated heat transfer fluid can be flashed to form a flashed saturated heat transfer fluid. A portion of the waste heat in the heated heat transfer fluid can be transferred to the flashed saturated heat transfer fluid to from a heated saturated heat transfer fluid.

The method can also include separating water vapor from the heated saturated heat transfer fluid to form a regenerated flashed heat transfer fluid.

The regenerated heat transfer fluid can be compressed to remove the separated or released water vapor and to form a recycled heat transfer fluid. The recycled heat transfer fluid can be recycled back to the heat recovery flow path.

In one or more embodiments, the heat recovery silencer can include an inner housing. The inner housing can include three or more silencing chambers. For example, the heat recovery silencer can include a first silencing chamber, a second silencing chamber, and a third silencing chamber.

The first silencing chamber can be in fluid communication with an inlet of the inner housing. For example, exhaust gas from a combustion system can flow into the inlet of the first silencing chamber and then flow into the inner housing. In one or more embodiments, the first housing can have an inlet remote or adjacent the first silencing chamber, and the inlet can be in communication with the combustion system and the first chamber. For example, one or more flow paths can be provided between the inlet of the inner housing and the first chamber by one or more openings formed in the inner housing. In one or more embodiments, one or more additional chambers or devices can be integrated or connected with the inner housing.

The second silencing chamber can be in fluid communication with the first silencing chamber. For example, a flow path or communication path can be formed between the first silencing chamber and the second silencing chamber by one or more tubes, channels, valves, ports, or any combination thereof. In one or more embodiments, one or more baffle tubes can be in fluid communication with the first silencing chamber and the second silencing chamber and provide fluid communication therebetween.

The third silencing chamber can be in fluid communication with two or more vectoring tubes. The vectoring tubes can be in fluid communication with the second silencing chamber. Accordingly, fluid or gas, such as exhaust from a combustion system, can flow from the second silencing chamber to the third silencing chamber through the vectoring tubes.

The vectoring tubes can provide spiraling flow to the gas or fluid flowing therethrough. The vectoring tubes can prevent or minimize back pressure to the third silencing chamber. The third silencing chamber and the second silencing chamber can be in fluid communication with from about 2 to about 100 vectoring tubes. For example, two vectoring tubes can be used to provide fluid communication between the third silencing chamber and the second silencing chamber. Accordingly, the contact between the gas or fluid and the inner surface of the inner housing in the third chamber can be optimized or maximized.

A vent can be in fluid communication with the third silencing chamber and an environment exterior thereto. The vent can include one or more flow control devices for controlling the rate of gas or fluid allowed to flow therethrough. The exterior of environment can be the atmosphere.

The heat recovery outer housing can be disposed about the inner housing. In one or more embodiments, the outer housing can encapsulate the inner housing.

The heat recovery flow path, such as a channel, space, or chamber, can be formed between the heat recovery outer housing and the inner housing.

In one or more embodiments, the first silencing chamber can be in fluid communication with a conduit, such as a half pipe. The conduit can also be in fluid communication with the third silencing chamber. Accordingly, the conduit can provide a flow path between the first silencing chamber and the third silencing chamber for at least a first portion of the gas or fluid, such as exhaust, in the first chamber. The conduit can help maintain a differential pressure between the third silencing chamber and the first silencing chamber. As such, a second portion of the gas or fluid, which can be larger than the first portion of the gas or fluid, will be able to flow from the first silencing chamber to the second silencing chamber, and from the second silencing chamber to the third silencing chamber.

The conduit can be secured to an outer surface of the inner housing, and an exterior portion of the conduit can be disposed or located within the heat recovery flow path. As such, the conduit can also maximize or increase the heat transferred from the gas or fluid in the inner housing with a gas or fluid in the heat recovery flow path.

In one or more embodiments, the heat recovery silencer can include a diffuser adjacent or in fluid communication with the first silencing chamber. The diffuser can provide a velocity drop and a direction change to the gas or fluid as the gas or fluid leaves the exhaust system of a combustion system and enters the heat recovery silencer.

The heat recovery silencer can also include a diffusion chamber disposed between the diffuser and the first silencing chamber. The diffusion chamber can be in fluid communication with the diffuser and the first silencing chamber.

In addition, one or more embodiments of the heat recovery silencer can be or include a catalyst element disposed or located between the diffuser chamber and the first silencing chamber. The catalyst element can be in fluid communication with the first silencing chamber and the diffuser chamber.

The catalyst element can include the catalyst device and the catalyst housing.

The catalyst device can be a plurality of sheets having a catalyst coating. The sheets can be wrapped around one another and a space can be formed between the sheets to allow exhaust gas or fluid to flow therebetween.

The catalyst device can include a metal group catalyst. The metal group catalyst can include platinum, ruthenium, palladium, or other metal group catalysts.

In an embodiment, the catalyst device can include a plurality of layers of metal group catalyst and a space or flow area can be located between each layer.

The catalyst element can receive a gas or fluid flowing from the combustion system to the first silencing chamber and provide a catalytic reduction or reaction to the gas or fluid flowing therethrough. The catalytic reaction can reduce NOX gas, volatile organic compounds, formaldehyde, or combinations thereof in the gas or fluid.

The catalyst housing can include an opening and an access cover disposed over the opening. The access cover can be mounted to the catalyst housing with a hinge. In addition, the catalyst housing can have a radius of curvature and the access cover can have a radius of curvature allowing the access cover to fit over at least a portion of the catalyst housing and seal the opening.

The catalyst housing can include four moveable pressure sealing bars, a catalyst element seating ring formed into the catalyst housing, and a seal plate. The four movable pressure sealing bars can be configured to push the catalyst device against the seal plate to form a pressure seal, which causes the exhaust gas to only flow through the catalyst element.

The heat recovery silencer can silence or muffle noise associated with a combustion exhaust system. In addition, the heat recovery silencer can reduce risks associated with multiple combustion systems by efficiently removing waste heat from exhaust gas of a combustion system, which allows waste heat to be used to generate electricity, dehydrate natural gas, heat water, influence or accelerate a chemical reaction, or perform other tasks requiring heat.

In one or more embodiments the heat recovery silencer can include a heat recovery outer housing encapsulating an inner housing to form a heat recovery flow path therebetween. The inner housing can have two silencing chambers formed or disposed therein. The silencing chambers can be in fluid communication with an inlet to the inner housing.

Two vectoring tubes can be used to provide fluid communication between the silencing chambers. A vent can be in fluid communication with the silencing chambers and an environment external to the housings.

Accordingly, exhaust gas can flow from the inlet of the inner housing into to one of the chambers. The exhaust gas can flow through the two vectoring tubes to the other chamber. The vectoring tubes can impart a spiraling flow to the exhaust gas as the exhaust gas is flowing therethrough. The exhaust gas can evacuate or flow out of the other chamber through the vent to the external environment.

Figure 2:
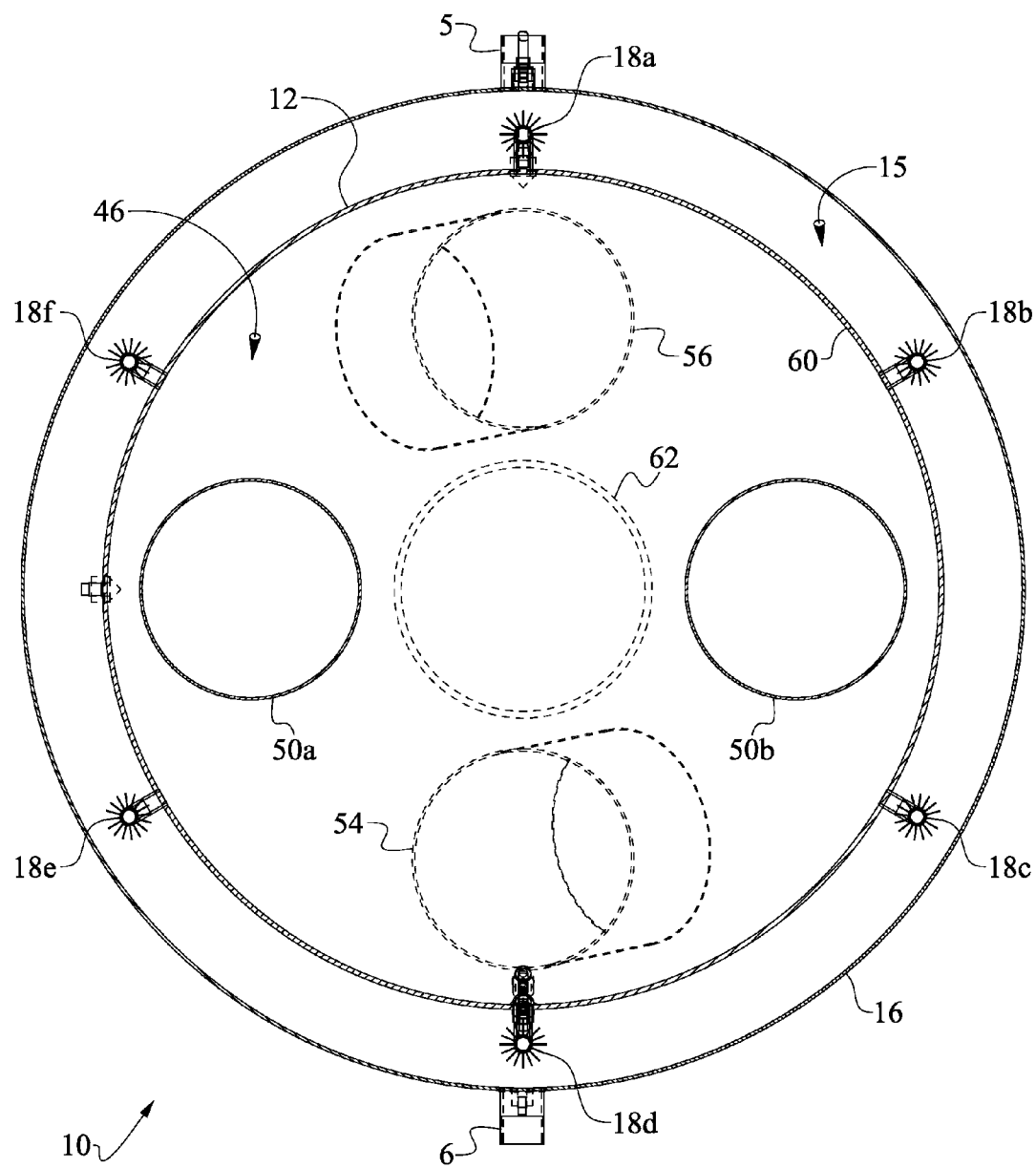
FIG. 2 depicts a cross sectional view of the heat recovery silencer of FIG. 1 along line A-A according to one or more embodiments.

Turning now the to Figures, FIG. 1 depicts a side view of an illustrative heat recovery silencer, and FIG. 2 depicts a cross sectional view of the heat recovery silencer of FIG. 1 along line A-A according to one or more embodiments.

FIGS. 1 and 2 show a heat recovery silencer 10 is depicted having an inner housing 12, a heat recovery outer housing 16, a heat recovery flow path 15 disposed or formed between the inner housing 12 and the heat recovery outer housing 16, a catalyst element 73, an access cover 74, a diffuser housing 57, a diffuser chamber 66, a diffuser inlet 59, and a diffuser 63. Although the heat recovery silencer is depicted in a horizontal position, other positions are possible, such as a vertical orientation. It would be possible for one skilled in the art with the aid of this disclosure to orient the heat recovery silencer 10 in any number of positions without undue experimentation.

The heat recovery outer housing 16 can be concentric with the inner housing 12. The heat recovery outer housing 16 can at least partially encapsulate the inner housing 12. The heat recovery outer housing 16 can be made from steel, carbon steel, ceramic, or other material capable of withstanding high temperatures. The heat recovery outer housing 16 can have one or more ports (two ports are shown as 5 and 6) formed therethrough.

The inner housing 12 can have three or more silencing chambers (three are shown as 46, 48, and 52) formed or located therein. The first silencing chamber 46 can be in fluid communication with an exhaust source. For example, an inlet, such as a diffuser inlet 59, can be connected to the inner housing 12 and in fluid communication with the first silencing chamber 46. One or more components can be located between the diffuser inlet 59 and the first silencing chamber 46 (as shown). The diffuser inlet 59 can be in direct fluid communication with the first silencer chamber 46.

The first silencing chamber 46 can also be in fluid communication with a second silencing chamber 48. For example, one or more baffle tubes (two are shown as 50a and 50b) can be in fluid communication with the first silencing chamber 46 and the second silencing chamber 48. The baffle tubes 50a and 50b can provide a flow path between the first silencing chamber 46 and the second silencing chamber 48.

The second silencing chamber 48 can be in fluid communication with a third silencing chamber 52. For example, one or more vectoring tubes (two are shown 54 and 56) can be in fluid communication with the second silencing chamber 48 and the third silencing chamber 52. The vectoring tubes 54 and 56 can provide a flow path between the second silencing chamber 48 and the third silencing chamber 52. The third silencing chamber 52 can be in fluid communication with a vent 62, which can be in fluid communication with an external environment.

The heat recovery flow path 15 can be a chamber, a channel, a space, a niche or other void between the inner housing 12 and the heat recovery outer housing 16. The heat recovery flow path 15 can be in fluid communication with the ports 5 and 6. The ports 5 and 6 can allow fluid to enter and exit the heat recovery flow path 15.

The inner housing 12 can have the catalyst element 73 disposed adjacent or connected thereto. The catalyst element 73 can include a catalyst housing 71 and a catalyst device disposed therein (as shown below in FIGS. 4A and 4B).

The diffuser housing 57 can be disposed adjacent and connected to the catalyst housing 71. The diffuser housing 57 can have a diffuser chamber 66 located therein. The diffuser chamber 66 can be in fluid communication with the first silencer chamber 46 and the diffuser inlet 59.

The diffuser 63, such as a conical diffuser, a baffle plate, a flow tube, or similar device that provides a velocity change to a flowing fluid or gas, can be located between the diffuser chamber 66 and the diffuser inlet 59. In one or more embodiments, the diffuser 63 can at least partially protrude into the diffuser chamber 66.

In operation, the diffuser inlet 59 can be placed in fluid communication with an exhaust of a combustion system 2. A high velocity exhaust gas stream 3 can flow from the exhaust of the combustion system 2 to the diffuser inlet 59.

The high velocity exhaust gas stream 3 can pass through the diffuser 63. The diffuser 63 can cause the velocity of the high velocity exhaust gas stream 3 to change. For example, the diffuser 63 can slow down and provide a direction change to the high velocity exhaust gas stream 3.

Accordingly, the high velocity exhaust gas stream 3 can be transformed to a low velocity exhaust gas stream 65 as it passes through the diffuser 63 and enters the diffuser chamber 66.

The low velocity exhaust gas stream 65 can flow through the diffuser chamber 66 into the catalyst housing 71.

As the low velocity exhaust gas stream 65 passes through the catalyst housing 71, a catalytic reaction can be imparted to the low velocity exhaust gas stream 65.

The low velocity exhaust gas stream 65 can flow from the catalyst housing 71 to the first silencing chamber 46. A second portion 8 of the low velocity exhaust gas stream 65 can flow from the first silencing chamber 46 to the second silencing chamber 48 via the baffle tubes 50a and 50b. A first portion 9 of the low velocity exhaust gas stream 65 can flow from the first silencing chamber 50 to the third silencing chamber 52 through a conduit 18a, 18b, 18c, 18d, 18e, and 18f.

The second portion 8 of the low velocity exhaust stream 65 can flow from the second silencing chamber 48 to the third silencing chamber 52 via the vectoring tubes 54 and 56. As the second portion 8 of the low velocity exhaust gas stream 65 passes through vectoring tubes 54 and 56, the vectoring tubes 54 and 56 can impart a spiral flow to the first portion 8 of the low velocity exhaust gas stream 65 as it enters the third silencing chamber 52.

As such, back pressure in the third silencing chamber 52 can be reduced and contact with an inner surface 60 of the inner housing 12 can be increased. The second portion 8 of the low velocity exhaust gas stream 65 can mix with the first portion 9 of the low velocity exhaust stream 65 in the third silencing chamber 52.

The second portion 8 and the first portion 9 of the low velocity exhaust gas stream 65 can exit the third silencing chamber 52 via the vent 62.

As the low velocity exhaust gas stream 65 flows through the inner housing 12, a heat transfer fluid 16, such as a diethylene glycol, a purified water, a triethylene glycol, a synthetic oil (300-600 F without degrading), a silicon fluid, a refrigerant, or other fluid, can enter the heat exchange flow path 15 via the right port 6 and flow to the left port 5.

As the heat transfer fluid 16 flows from the right port 6 to the left port 5, indirect heat exchange can occur between the low velocity gas exhaust stream 65 and the heat transfer fluid 16. The heat transferred from the low velocity gas exhaust stream 65 to the heat transfer fluid 16 can form heated heat transfer fluid 26. The heated heat transfer fluid 26, which can be a vapor or liquid, can exit the left port 5 and be provided to an end use.

Figure 3:
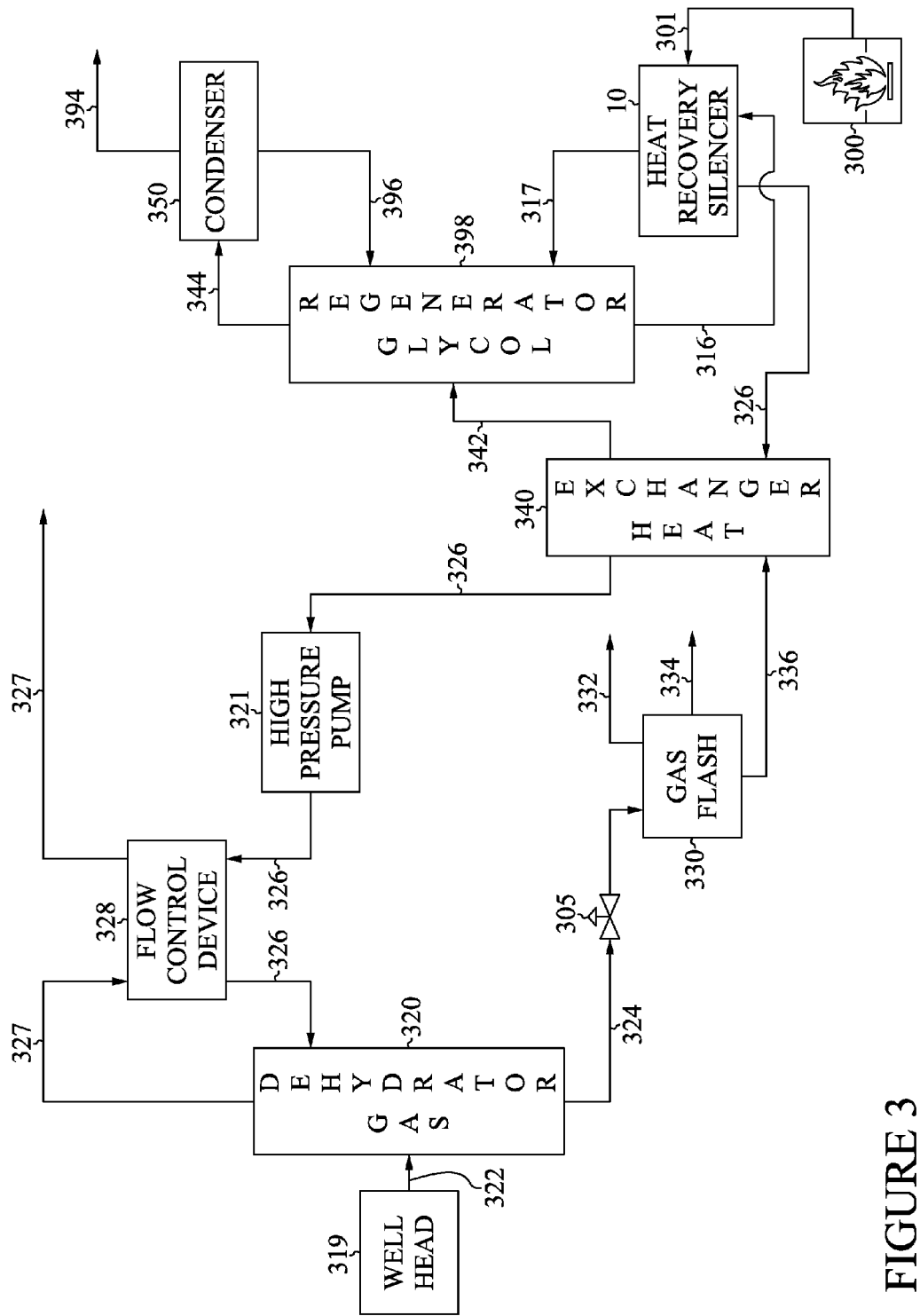
FIG. 3 depicts a schematic of an illustrative system utilizing a heat recovery silencer according to one or more embodiments.

FIG. 3 depicts a schematic of an illustrative system for dehydrating natural gas utilizing a heat recovery silencer according to one or more embodiments. The system can include the heat transfer silencer 10, a high pressure pump 321, a gas dehydrator 320, a natural gas well 319, a glycol regenerator 398, a heat exchanger 340, a gas flash 330, and a flow control device 328.

The high pressure pump 321 can be an electric pump or a hydraulic pump. The high pressure pump 321 can provide a pressure or pump head from about 20 psig to about 350 psig.

The gas dehydrator 320 can be a glycol contactor or similar device that can use a heated heat transfer fluid to absorb or extract water from a wet natural gas 322 provided from a natural gas well head 319.

The natural gas well head 319 can be in communication with one or more natural gas producing reservoirs and can be configured to extract natural gas from the reservoir.

The glycol regenerator 398 can be a glycol regenerator or similar device used in the art.

The heat exchanger 340 can be a fin fan heat exchanger or other heat exchanging device. The heat exchanger 340 can have two or more flow paths formed therethrough.

The gas flasher 330 can be a gas flash device or similar device used in the art.

The flow control device 328 can be a butterfly valve, a solenoid valve, or similar devices for controlling the flow of fluid therethrough. In one or more embodiments, the flow control device 328 can have one or more flow paths therethrough.

In operation, a heat transfer fluid 316, such as a glycol, can be provided to the heat recovery flow path 15. An exhaust 301 from a combustion system 300, such as a diesel engine or internal combustion engine, can be provided to the inner housing 12 of the heat recovery silencer 10.

As the heat transfer fluid 316 flows through the heat recovery flow path 15, heat from the exhaust 301 can be transferred to the heat transfer fluid 316 to form a heated heat recovery fluid 326.

The heated heat recovery fluid 326 can flow through the heat exchanger 340. The high pressure pump 321 can be used to provide pressure to the system to flow the heated heat transfer fluid 326 from the heat recovery silencer 10 to the gas dehydrator 320. As the heated heat transfer fluid 326 flows to the gas dehydrator 320, the heated heat transfer fluid 326 can pass through the high pressure pump 321 and the flow control device 328. The flow control device 328 and the high pressure pump 321 can be controlled by a control system (not depicted) to ensure adequate pump head and temperature of the heated heat transfer fluid 326.

The heated heat transfer fluid 326 can commingle with or dehydrate a wet gas 322 being provided from the well head 319 to the gas dehydrator 320. The heated heat transfer fluid 326 can absorb water from the wet gas 322 until a saturated heat transfer fluid 324 and a dry gas 327 are formed. A flow control device 305 can control the rate of the saturated heat transfer fluid 324 flowing from the gas dehydrator 320. The dry gas 327 can flow or be provided to an end use, such as a pipeline.

The saturated heat transfer fluid 324 can pass through the gas flasher 330, and a hydrocarbon vapor 332 can be removed from the saturated heat transfer fluid 324 and a liquid hydrocarbon 334 can be skimmed or removed from the saturated heat transfer fluid 324 to form a flashed heat transfer fluid 336.

The flashed heat transfer fluid 336 can travel from the gas flasher 330 to the heat exchanger 340. The flashed heat transfer fluid 336 can exchange heat with the heated heat transfer fluid 326 flowing through the heat exchanger 340 to form heated flashed heat transfer fluid 342.

The heated flashed heat transfer fluid 342 can be provided to the glycol regenerator 398. The glycol regenerator 398 can release any remaining water vapor in the heated flashed heat transfer fluid 342 to form a regenerated flashed heat transfer fluid 344.

The regenerated flashed heat transfer fluid 344 can flow from the glycol regenerator 398 to the condenser 350 where a released water vapor 394 is removed from the regenerated flashed heat transfer fluid 344 to form recycled heat transfer fluid 396.

The recycled heat transfer fluid 396 can flow back through the glycol regenerator 398 and flow into the heat recovery silencer 10 as the heat transfer fluid 316 and can be reheated to form the heated heat transfer fluid 326.

A portion 317 of the heated heat transfer fluid 326 can be provided to the glycol regenerator 398 to provide at least a portion of the heat required to operate the glycol regenerator 398.

Each component of the system can be in communication with a control system (not depicted) that can acquire data related to the individual components of the system and selectively control the components of the system. For example, the control system can control a flow control valve (not depicted) used to control the flow rate of the portion 317 of the heated heat transfer fluid provided to the glycol regenerator 398. The control system can be any control system used in the art and can employ any number of flow control devices to control the flow rates of fluid through the system. The control system can be implemented by one skilled in the art with the aid of this disclosure without undue experimentation.

Figure 4A:
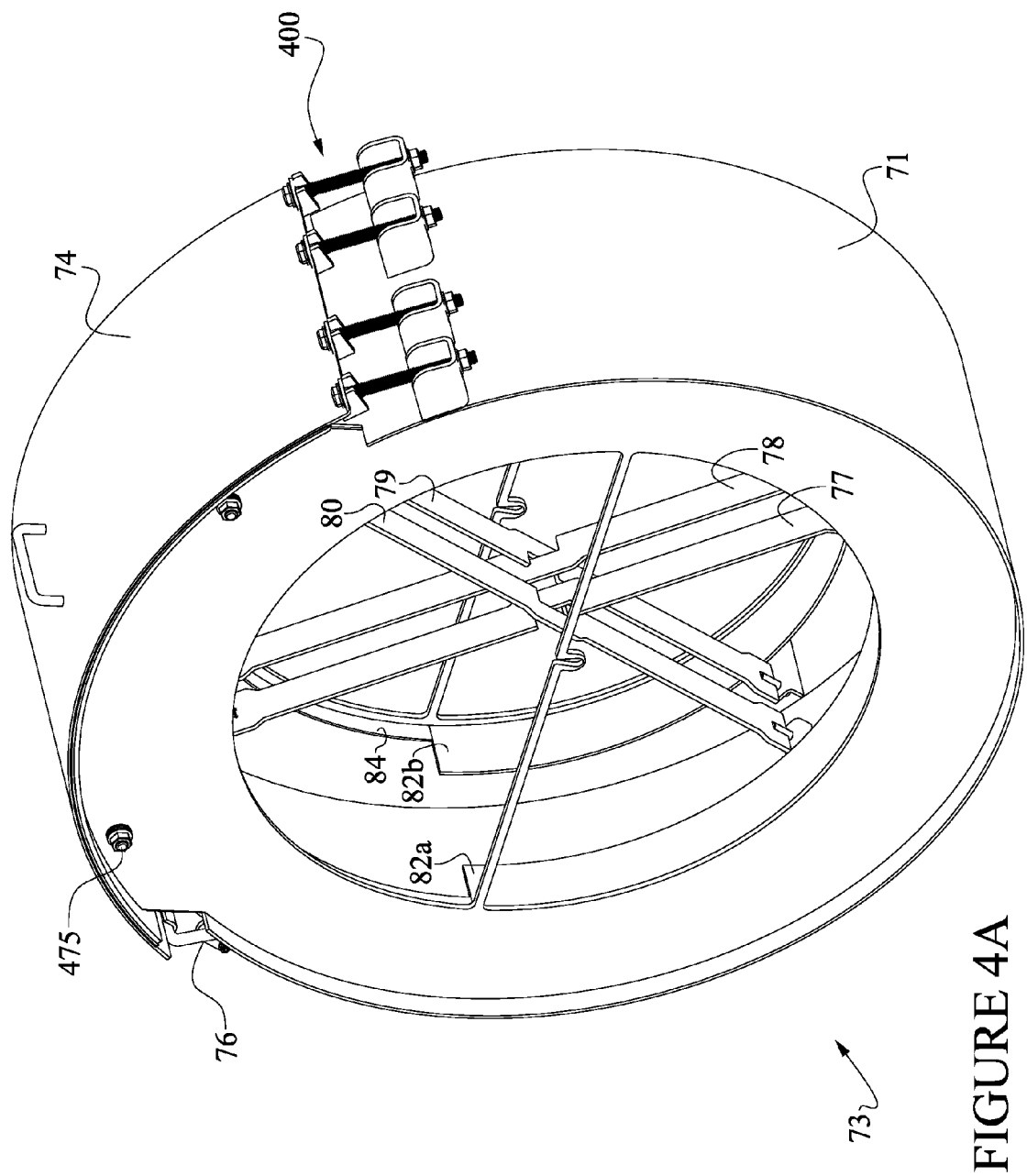
FIG. 4A depicts an illustrative catalyst housing usable with the heat recovery silencer according to one or more embodiments.
Figure 4B:
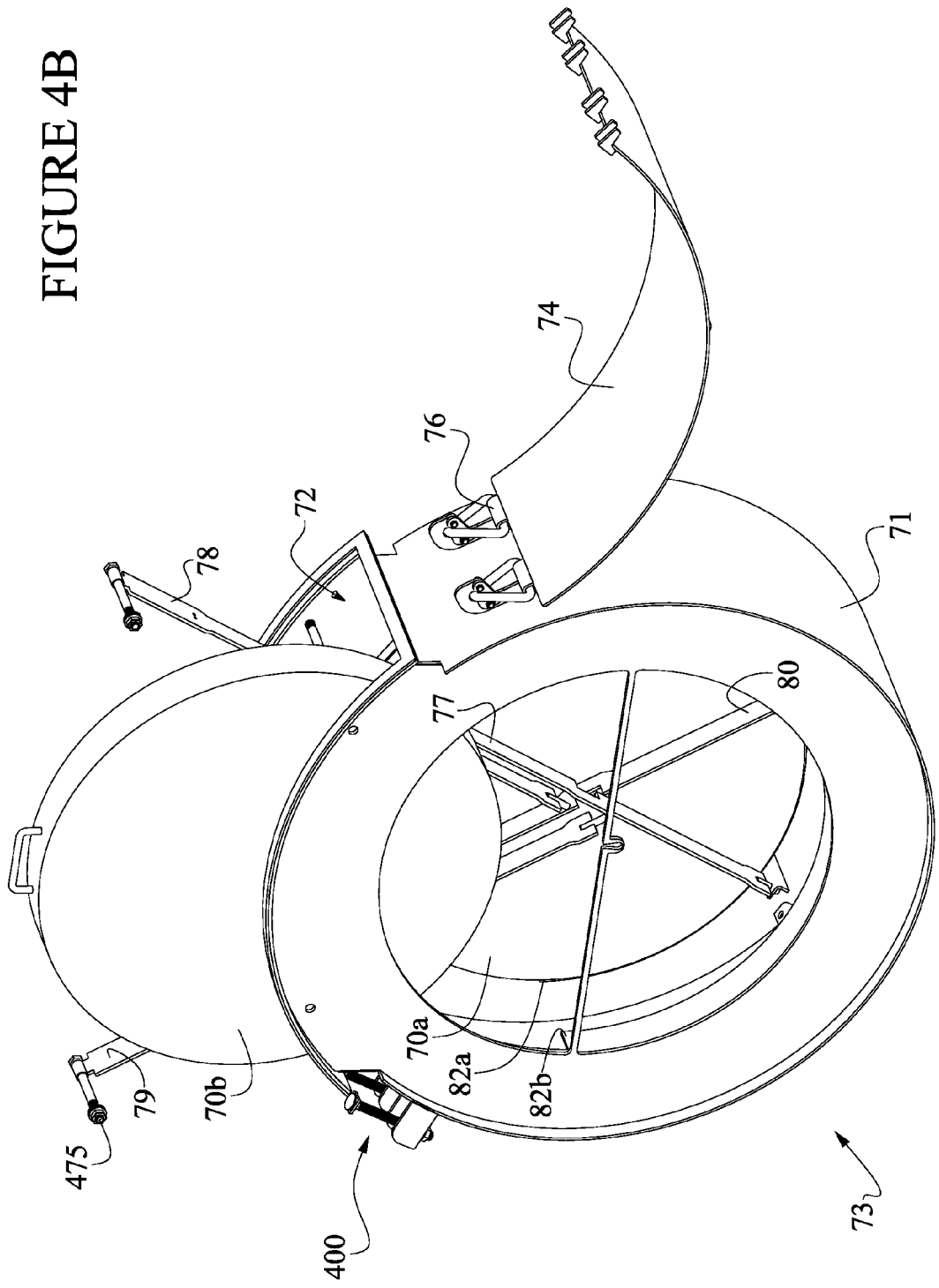
FIG. 4B depicts an illustrative view of the catalyst housing of FIG. 4A having a catalyst device disposed therein.

FIG. 4A depicts a catalyst housing 71 usable with the heat recovery silencer 10 according to one or more embodiments. FIG. 4B is a view of the catalyst element 73 having catalyst devices 70a and 70b being disposed therein. Referring to FIGS. 4A and 4B, the catalyst element 73 can include the catalyst housing 71. The catalyst housing 71 can include one or more seating rings (two are shown as 82a and 82b), one or more housing seal plates 84, an access cover 74, an opening 72, and at least four moveable pressure sealing bars 77, 78, 79, and 80.

The opening 72 can allow one or more catalyst devices 70a and 70b to be placed into the catalyst housing 71. The opening 72 can be blocked or sealed by the access cover 74. The access cover 74 can be mounted to the catalyst housing 71 by the hinge 76. When the access cover 74 seals the opening 72, a lock mechanism 400 can be used to secure the access cover 74 in place.

The catalyst element can sit on the seating rings 82a and 82b, and the seating rings 82a and 82b can ensure proper positioning of the catalyst devices 70a and 70b within the catalyst housing 71.

The at least four moveable pressure sealing bars 77, 78, 79, and 80 can be fixed at one end. The other end of the at least four moveable pressure sealing bars 77, 78, 79, and 80 can be moved to press one or more of the catalyst devices against the seal plate 84 by a tightening device 475. Accordingly, a pressure seal can be formed between the seal plate 84 and the catalyst devices.

Figure 5:
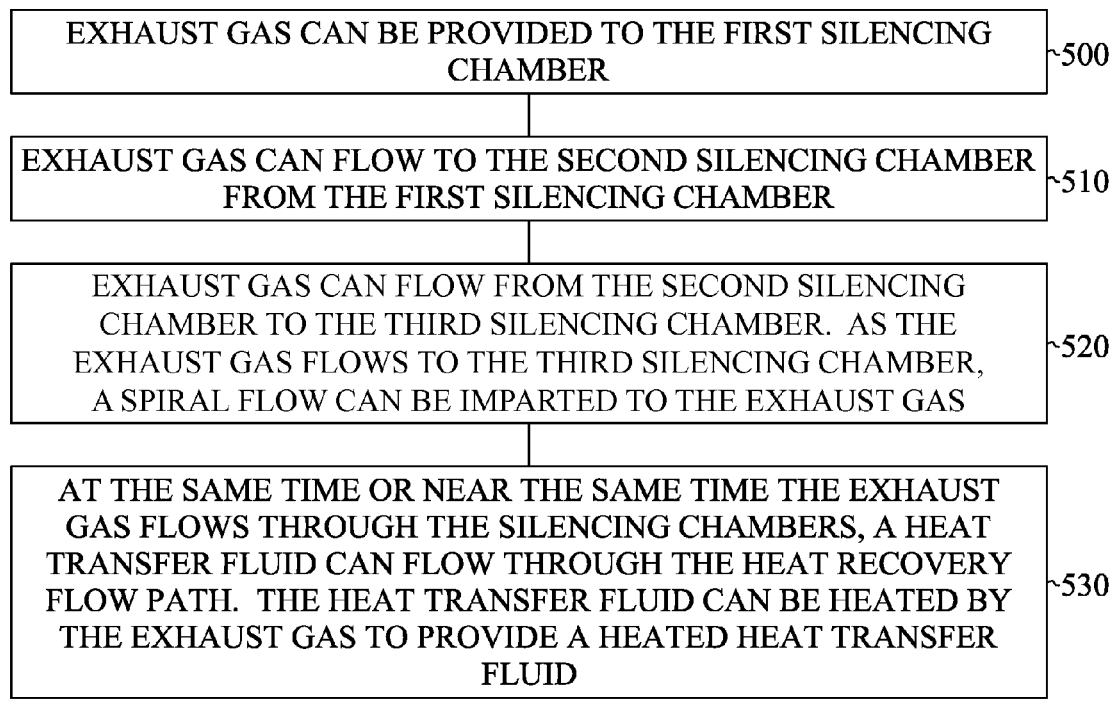
FIG. 5 depicts a flow diagram for an illustrative method of using the heat recovery silencer according to one or more embodiments.

FIG. 5 depicts a flow diagram for an illustrative method of using the heat recovery silencer according to one or more embodiments.

At box 500, exhaust gas can be provided to the first silencing chamber. At box 510, the exhaust gas can flow to the second silencing chamber from the first silencing chamber.

At box 520, the exhaust gas can flow from the second silencing chamber to the third silencing chamber. As the exhaust gas flows to the third silencing chamber, a spiral flow can be imparted to the exhaust gas.

At the same time or near the same time the exhaust gas flows through the silencing chambers, a heat transfer fluid can flow through the heat recovery flow path. The heat transfer fluid can be heated by the exhaust gas to provide a heated heat transfer fluid, as depicted at box 530. For example, the heat transfer fluid can be heated by the exhaust gas by indirect heat transfer.

While these embodiments have been described with emphasis on the embodiments, it should be understood that within the scope of the appended claims, the embodiments might be practiced other than as specifically described herein.

What is claimed is:

1. A method for recovering waste heat from a combustion system performing a first operation and performing a second operation with the waste heat, wherein the method comprises:
 a. providing exhaust from the combustion system to an inner housing of a heat recovery silencer, wherein the inner housing comprises:
  (i) a first silencing chamber having an inlet at one end;
  (ii) a second silencing chamber in fluid communication with the first silencing chamber, wherein the second silencing chamber is in fluid communication with a first end of two vectoring tubes;
  (iii) a third silencing chamber in fluid communication with a second end of the two vectoring tubes; and
  (iv) a vent in fluid communication with an environment exterior to the third silencing chamber and the third silencing chamber;
 b. heating a heat transfer fluid in a heat recovery flow path formed between the inner housing and an outer housing of the heat recovery silencer to form a heated heat transfer fluid;
 c. flowing the heated heat transfer fluid to an auxiliary device inlet port of an auxiliary device, and using the heated heat transfer fluid to perform the second operation, which forms a used heated heat transfer fluid; and
 d. recycling the used heated transfer fluid back to an inlet of the heat recovery flow path.

2. The method of claim 1, further comprising one or more baffle tubes located between the first silencing chamber and the second silencing chamber.

3. The method of claim 1, further comprising a flow path exterior to the inner housing between the first silencing chamber and the third silencing chamber.

4. The method of claim 1, further comprising changing the velocity and direction of the exhaust before the exhaust enters the inner housing.

5. The method of claim 4, further comprising catalytically reforming the exhaust before the exhaust enters the inner housing and subsequent to changing the velocity and direction of the exhaust.

6. The method of claim 1, wherein the auxiliary device is a heat exchanger, a gas dehydrator, a regeneration unit, or combinations thereof.

7. The method of claim 1, wherein the heat transfer fluid is a member of the group consisting of: a diethylene glycol, a purified water, a triethylene glycol, a synthetic oil, a silicon fluid, a refrigerant, and combinations thereof.

8. A method for recovering waste heat from a combustion system performing a first operation and performing a second operation with the waste heat, wherein the method comprises:
 a. providing exhaust from the combustion system to an inner housing of a heat recovery silencer, wherein the inner housing comprises:
  (i) a first silencing chamber having an inlet at one end;
  (ii) a second silencing chamber in fluid communication with the first silencing chamber, wherein the second silencing chamber is in fluid communication with a first end of two vectoring tubes;
  (iii) a third silencing chamber in fluid communication with a second end of the two vectoring tubes; and
  (iv) a vent in fluid communication with an environment exterior to the third silencing chamber and the third silencing chamber;
 b. heating a heat transfer fluid in a heat recovery flow path formed between the inner housing and an outer housing of the heat recovery silencer to form a heated heat transfer fluid;
 c. removing water from a wet gas by using the heated heat transfer fluid to form a saturated heat transfer fluid;
 d. flashing the saturated heat transfer fluid to form a flashed saturated heat transfer fluid;
 e. transferring a portion of the waste heat from the heated heat transfer fluid to the flashed saturated heat transfer fluid to form a heated saturated heat transfer fluid;
 f. separating water vapor from the heated saturated heat transfer fluid to form a regenerated flashed heat transfer fluid;
 g. compressing the regenerated flashed heat transfer fluid to remove the separated water vapor and to form a recycled heat transfer fluid; and
 h. flowing the recycled heat transfer fluid back to the heat recovery flow path.

9. The method of claim 8, further comprising one or more baffle tubes located between the first silencing chamber and the second silencing chamber.

10. The method of claim 8, further comprising a flow path exterior to the inner housing between the first silencing chamber and the third silencing chamber.

11. The method of claim 8, further comprising changing the velocity and direction of the exhaust before the exhaust enters the inner housing.

12. The method of claim 11, further comprising catalytically reforming the exhaust before the exhaust enters the inner housing and subsequent to changing the velocity and direction of the exhaust.

13. The method of claim 8, wherein the heat transfer fluid is a member of the group consisting of: a diethylene glycol, a purified water, a triethylene glycol, a synthetic oil, a silicon fluid, a refrigerant, and combinations thereof.

14. A method for recovering waste heat from a combustion system performing a first operation and performing a second operation with the waste heat, wherein the method comprises:
 a. providing exhaust from the combustion system to an inner housing of a heat recovery silencer, wherein the inner housing comprises:
  (i) two silencing chambers in fluid communication with an inlet of the inner housing;
  (ii) two vectoring tubes for providing fluid communication between the silencing chambers; and
  (iii) a vent in fluid communication with the silencing chambers and an environment external to the housings;
 b. heating a heat transfer fluid in a heat recovery flow path between the inner housing and a heat recovery outer housing to form a heated heat transfer fluid;
 c. performing the second operation by using the heated heat transfer fluid to form a used heated heat transfer fluid; and
 d. recycling the used heated heat transfer fluid back to the heat recovery flow path.

15. The method of claim 14, further comprising a flow path exterior to the inner housing between the first silencing chamber and the second silencing chamber.

16. The method of claim 14, further comprising changing the velocity and direction of the exhaust before the exhaust enters the inner housing.

17. The method of claim 16, further comprising catalytically reforming the exhaust before the exhaust enters the inner housing and subsequent to changing the velocity and direction of the exhaust.

18. The method of claim 14, wherein the second operation comprises dehydrating gas, heating water, accelerating a chemical reaction, generating electricity, running a regeneration unit, or combinations thereof.

19. The method of claim 14, wherein the heat transfer fluid is a member of the group consisting of: a diethylene glycol, a purified water, a triethylene glycol, a synthetic oil, a silicon fluid, a refrigerant, or combinations thereof.

* * * * *